Figure 1:
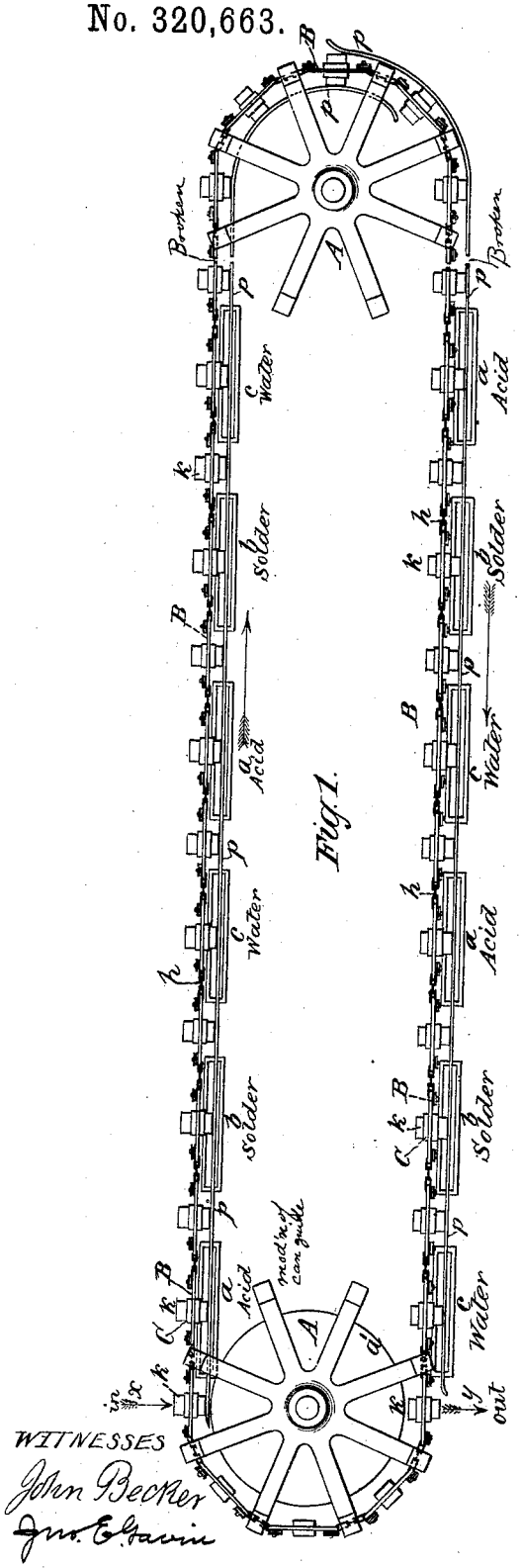

(No Model.) 2 Sheets—Sheet 1.

F. M. LEAVITT.
CAN SOLDERING MACHINE.

No. 320,663. Patented June 23, 1885.

WITNESSES
John Becker
Jno. E. Gavin

INVENTOR
Frank M. Leavitt
by Chas. M. Higgins
attorney

N. PETERS, Photo-Lithographer, Washington, D. C.

(No Model.) 2 Sheets—Sheet 2.
F. M. LEAVITT.
CAN SOLDERING MACHINE.
No. 320,663. Patented June 23, 1885.
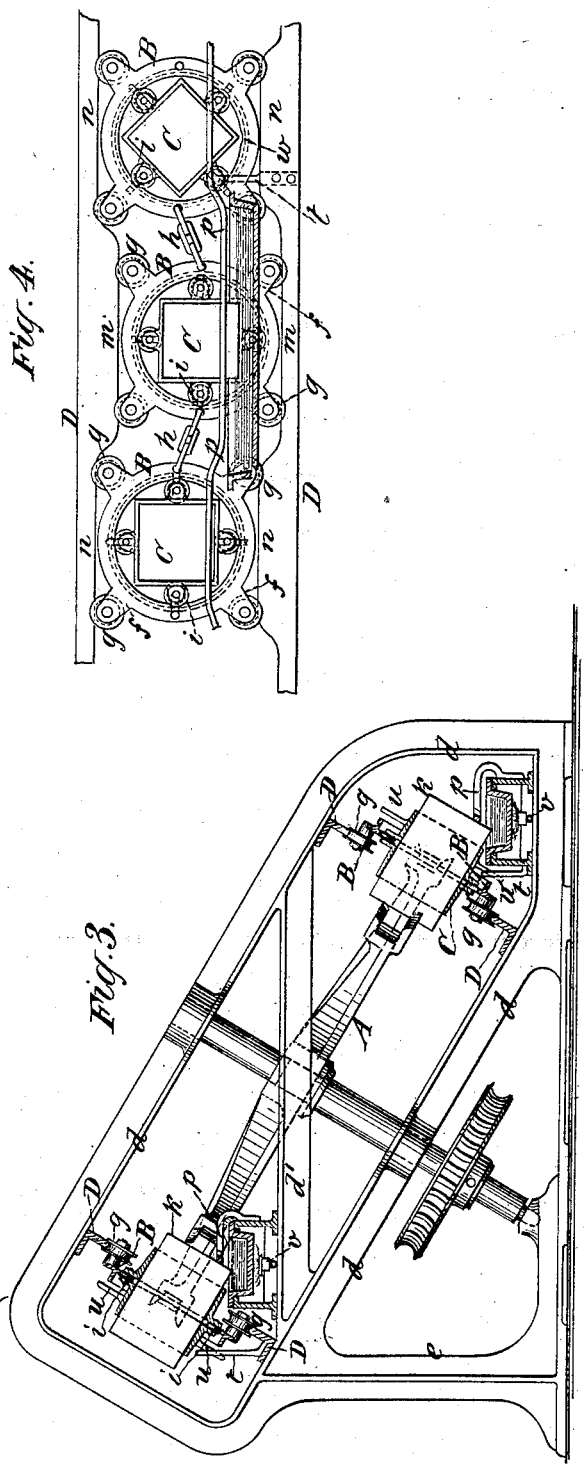

UNITED STATES PATENT OFFICE.

FRANK M. LEAVITT, OF BROOKLYN, ASSIGNOR TO ELIPHALET W. BLISS, OF NEW UTRECHT, NEW YORK.

CAN-SOLDERING MACHINE.

SPECIFICATION forming part of Letters Patent No. 320,663, dated June 23, 1885.

Application filed May 7, 1885. (No model.)

*To all whom it may concern:*

Be it known that I, FRANK M. LEAVITT, of Brooklyn, Kings county, New York, assignor to Eliphalet W. Bliss, of New Utrecht, Kings county, New York, have invented certain new and useful Improvements in Can-Soldering Machines, of which the following is a specification.

This invention belongs to that class of soldering-machines designed for soldering the end joints of square cans, in which the cans are carried by a series of traveling can-holders over a successive series of troughs, holding, respectively, acid, solder, and water, the can-holders being alternately raised and lowered as they approach, enter, and leave the troughs, so as to dip the edge first in acid, thence in the solder, and finally in the cooling-water, the can being partially revolved between each group of troughs to bring another side into position for soldering.

Two decided types of machines of this class have been heretofore devised. The first type consists of a central upright rotary shaft carrying a series of radial can-holders which revolve over a sinuous circular track and over a circumferential series of grouped troughs adjacent to said track. The holders are raised and lowered by moving over the sinuous track to dip the can in and raise it from the troughs, while the holders are partly revolved between each group of troughs by encountering cam-projections in its path of travel. This machine, however, solders but one end of the cans at one circuit, the cans being reversed end for end in the holders after they have made one circuit of the machine. In the second type of machine the can-carriages are linked together, forming an endless chain which travels in an endless track of oval form. The can-holders are mounted in trunnions in the linked carriages, and are capable of being tilted from side to side of the track, to thus incline either end of the can down into a series of troughs arranged half on one side of the track and half on the other side, so that as the chain of linked carriages are advanced the holders are tilted on one side of the track, and one end of the can soldered, and are then tilted to the other side of the track to solder the opposite ends. The can-holders are of course also capable of revolving in their tilting carriers to turn successive sides of the can into position for soldering as they pass successive groups of troughs. My present invention belongs to this latter type of machine, but is an important improvement thereon in several respects, as will hereinafter more fully appear. In the former machine the endless chain of linked carriages was active on one-half only—that is, one-half or side of the chain only carried the cans, the other half or side returning empty.

In my machine the action is continuous on both halves of the chain, the unsoldered cans being inserted at one point of the chain and removed at another point, one side of the chain presenting one end of the cans to the soldering-troughs, while the passing of the chain around the chain-wheels relatively reverses the position of the cans and presents the opposite ends to the opposite set of soldering-troughs, so that all sides and both ends of the cans are soldered in one circuit of the machine. This feature constitutes one of the leading points of my invention. Furthermore, in my invention the endless chain of carriages revolve in an inclined plane, with one set of soldering-tanks at the elevated side on the inner side of the chain, while the other set of tanks is at the bottom of the incline at the outer side of the chain, which forms a prominent feature of my invention.

My invention also lies in certain details of construction relating to the form of the tracks and the linked carriages in relation therewith; also in the special details in the carriage and can-holder, as hereinafter fully set forth.

Figure 2:
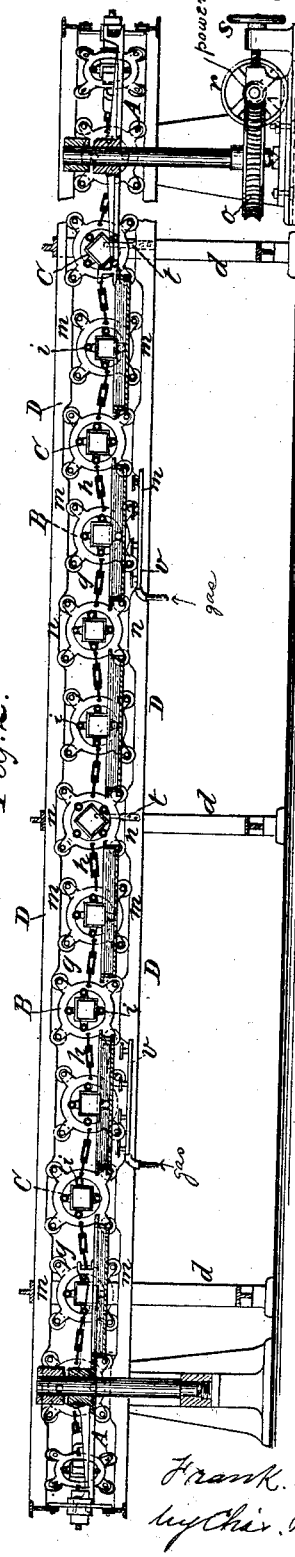

In the annexed drawings, Figure 1 presents a plan view of my improved soldering-machine, the view being partly diagrammatic or skeleton in its nature. Fig. 2 is a central longitudinal section of the machine. Fig. 3 is an enlarged cross-section showing more clearly the inclined arrangement of the endless chain of linked-carriages and their chain-wheels, with the novel arrangement of the two series of tanks. Fig. 4 is an enlarged fragmentary elevation of part of the chain of linked carriages with their guiding-tracks and solder-trough.

In Figs. 1 and 2 the machine is shown only about half its actual length, the chain being broken and contracted at the right end in order to admit of illustration on the sheet. It will be seen that but six troughs are shown on each side of the machine, whereas in the complete machine twelve are used on each side to complete the soldering of the four sides of the can. The machine, while apparently complicated at first sight, is in fact simple, and consists of but a few main elements, so that a general understanding of the machine may be given in a brief description. Referring, therefore, to Figs. 1 and 2, the machine consists, mainly, of two large chain-wheels, A A, the endless chain of linked carriages B B, carrying the can-holders C, which pass around said chain-wheels, the guiding-tracks D D, in which the carriages move, and the soldering-troughs $a$ $b$ $c$, containing, respectively, acid, solder, and water, arranged adjacent to the tracks, and in which the cans are dipped as they pass said troughs.

The structural frame-work of the machine consists of a series of transverse frames, $d$ $d$, (seen best in Figs. 3 and 2,) which are arranged at intervals, as seen in Fig. 2, and are rigidly braced together by the guiding-tracks D D. These frames $d$ $d$, as seen best in Fig. 3, are of an oblong rectangular form, arranged in an inclined position, with the lower end resting on the floor and the higher end supported on the pillars or feet $e$. It will also be seen from Fig. 3 that the axis of the chain-wheels are arranged in an inclined position, and that the chain-wheels revolve in an inclined-plane at or about an angle of about forty-five degrees, and in a position which is about level with the middle of the frames $d$, which are inclined at about the same angle; hence the endless-chain of the linked carriages revolves in an inclined plane level with the inclined wheels, so that one side or half of the chain passes close to the floor in the lower end of the frames $d$, while the other side or half passes high above the floor in the upper part of the frames, as well shown in Fig. 3.

The endless chain, as seen best in Figs. 2 and 4, is made of the series of linked carriages, B B, each of which consists of a simple ring-shaped casting having four radial ears, $f$ $f$, in which the grooved wheels or rollers $g$ $g$ are mounted, and these wheels roll on the edge of the double guiding-tracks D D, so that the carriages are thus free to travel longitudinally in the tracks, but are prevented from any lateral displacement, the carriages being linked together to form a continuous chain by the chain-links $h$ $h$.

The can-holders C C fit within the ring of the carriages B B, and are simply square open-ended boxes adapted to receive the square cans $k$, as seen best in Figs. 3 and 4, and are provided on their four sides with ears in which four grooved rollers, $i$ $i$, are mounted, which engage the edge of the carriage-ring, and thus leave the holder free to turn in the carriage, yet prevent the sidewise displacement of the holder, as will be understood.

Now, adjacent to the guiding-tracks D D are arranged the troughs $a$ $b$ $c$, which contain soldering-acid, solder, and water in successive order, as indicated in Fig. 2, and the tracks, as seen in Figs. 2 and 4, have an indented or zigzag contour forming a zigzag way in which the carriages move, so that as they pass the troughs the carriages receive a falling and rising motion, to alternately dip the cans into and raise them from the troughs—that is, referring to Figs. 2 and 4, the edges of the tracks are made with a long depressed part, $m$, and a shorter raised part, $n$, the elevations $n$ being between each depression $m$, and the depressed part being blended into the raised parts by rounded inclines, up and down which the wheeled carriage can easily ride, as seen in Figs. 2 and 4. The long depressions are coincident with each trough, while the short elevations are between the ends of the troughs, as best shown in Figs. 2 and 4. It may now be seen by referring to Fig. 3 that one set of troughs is placed at the lower end of the frames, and along the outer side of the endless chain of carriages, while the other set of troughs is placed at the upper end of the frames along the inner side of the endless chain, (see also Fig. 1,) the latter troughs being supported on the diagonal central cross-bars, $d'$, of the frames $d$, as shown in Fig. 3. It will be seen on again referring to Fig. 3, that while both sets of troughs are set in level positions, the endless chain of carriages move in a plane inclined thereto, and the can-holders on each side of the chain project toward the troughs at similar inclinations, which is preferably an angle of forty-five degrees, as shown. When, therefore, the cans $k$ are mounted in the holders, as seen in Fig. 3, and also in Fig. 1, the ends of the cans will project over and into the troughs, and the level of the contents of the troughs will be sufficient to just submerge the corner or joint-edge of the can in the usual manner, as will be readily understood from Fig. 3. In order, however, to limit the movement of the can and regulate its presentation to and its dip in the troughs, the ends of the can will strike against and slide along a gage or guard-rail, $p$, projecting over the tops of the troughs, as well shown in Figs. 3, 4, and 1, which will thus determine the proper position or gaging of the cans when being moved through the troughs.

To set the machine in motion, power is applied to the pulley $r$, Fig. 2, which drives a worm, which gears with the worm-wheel $o$ on the shaft of one of the chain-wheels, thereby moving the endless chain of linked carriages along the tracks past the troughs and around the chain-wheels in a continuous manner. By turning the hand-wheel $s$, the driving-chain wheel and its bearing, &c., may be adjusted in or out, to take up the slack of the chain and put any necessary tension thereon, as will be understood from Fig. 2.

The general construction of the machine having been now described, the action thereof will be readily understood. Thus the troughs being first properly charged with soldering-acid, molten solder, and water to the proper level, and the soldering-troughs being properly heated by gas-burners $v\ v$, or other means, the endless chain is then set in motion, as indicated by the arrows in Figs. 1, 2, and 4. The unsoldered cans are then inserted in the successively passing holders at the point $x$, (shown in Fig. 1,) whereby the cans will be carried successively over the whole series of troughs, making one complete circuit to the opposite side of the machine, where they will be removed at the point $y$, the holders then returning empty only on that part of the chain which passes around the chain-wheel between the points $x$ and $y$. It will, therefore, now be seen that as the linked carriages advance with the cans the carriage will first ascend the elevations $n$ in the tracks, (see Figs. 2 and 4,) and thus raise the end of the can above the troughs, immediately after which the carriage will descend into the depression $m$ and dip the can into and move it through the first trough, thus flushing the joint with the soldering-acid. As the carriage encounters the next elevation it will raise the can out of the acid and bring it over the solder-trough, and as it falls into the next depression $m$ it will then dip the can in and move it through the trough to solder the joint, after which it will raise the can in a similar manner out of the solder and dip the joint in and move it through the next or water trough to cool the joint. This cooling operation will prevent the running of the solder when the can is turned around to bring the next unsoldered side into action, which turning occurs between each set of troughs, and is accomplished as follows: Between each group of troughs a fixed projection, $t$, rises from the lower track D, in the path of cam projections $u\ u$ on the can-holders, as seen in Figs. 2, 3, and 4, there being one of such cams $u$ on each of the four sides of the can-holders, as shown in Fig. 4; hence, when the can has passed through the first group of troughs with one of its sides soldered and the solder cooled thereon, the cam $u$ on the holder strikes the projection $t$, and as the holder advances past the projection the cam-engagement of the parts causes the holder to make one-quarter revolution to bring the next unsoldered side of the can into relation with the next set of troughs, where the action just described is repeated, and so on until all four sides of the can are soldered. This soldering of the four sides on one end of the can occurs while the cans are passing on one side of the machine, the cans passing over twelve troughs and being turned one-quarter four times by encountering four of the projections $t\ t$, as will be understood from Figs. 1 and 2, where, however, only half the length of the full machine is shown. When, therefore, the cans have passed the twelfth trough, with one end completely soldered, they will next pass around the chain-wheel, and here it will be observed that the soldered end will now be turned toward the wheel, while the opposite unsoldered ends will be turned outward, so that the positions of the cans thus become relatively reversed, and, therefore, as the chain advances it will present unsoldered ends to the second set of troughs, and these ends will now be soldered in the same manner as the front ends, so that when the cans arrive at the point $y$ they will be completely soldered at both ends, and may therefore be removed from the machine; hence by this arrangement the cans move in a smooth continuous manner through the machine, and by making one circuit with the chain around one of the wheels all sides on both ends are soldered without any reversal, removal, or tilting action whatever of the cans in the carriages or chain, as heretofore, thus producing a machine which is very simple, rapid, and effective in its action, and is an important improvement in this type of machines.

It will be seen that each time that the can-holder is turned to present a fresh side of the can to the troughs, the lowest wheel on the can-holder will fall into a rounded notch, $w$, on the carriage, (see Fig. 4,) which will hold the can-holder firmly in that position, with the side of the can parallel with the trough and prevent the accidental displacement of the can from that position during its passage through one set of troughs.

Referring to Figs. 1, 2, and 3, it will be seen that the spokes or arms of the chain-wheels A project between and bear upon the linked carriages B B to make a driving engagement therewith, while the tip of the spoke is forked to straddle the connecting-links $h$ between the carriages. It will be also seen by referring to the right of Fig. 1 that the guide-rails $p\ p$ are carried partly around the chain-wheel, and overlap or break joints with each other, and are flared out at the overlapping ends to guide the cans effectively around the wheel. If desired, however, the guide-rails may terminate at the wheels, and the wheels may have a large hub or rim, $a'$, against which the ends of the can will abut in passing around the curve, as shown at the left of Fig. 1.

On reference to Fig. 2 it will be seen that the guiding-tracks D at each end, where they pass around the chain-wheels, are made smooth or without the elevations and depressions $m\ n$, so that the carriages pass smoothly around the wheels without any rising or following motion, which occurs only in passing the troughs.

It will be readily understood that it is not essential that the endless chain or ring of carriages pass in an elongated oval form over wheels at each end loop, as the chain or ring of carriages may move in any other form of a closed or endless circuit, whether oval, circular, or otherwise, and may be propelled in any suitable way, provided the troughs are arranged half on one side of the circuit and half on the other, the troughs being inside of the ring on one side and outside of it on the opposite side, with the ring or chain presented or inclined to the troughs, as shown, which is the essential feature of my invention, whereby I accomplish the continuous soldering action described, and effect the soldering of both ends of the can at one circuit without reversing the can in its holder.

I do not limit myself to any special construction of the carriages, tracks, can-holders, troughs, or other details, as these may vary without departing from the principle of my machine.

What I claim is—

1. A can-soldering machine consisting of an endless chain or ring of can-holders movable in a closed or endless circuit, and adapted to rise and fall intermittently as they advance, and partly revolve at intervals, in combination with a series of soldering-troughs, one half arranged on the inside of the ring on one side of the circuit in relation with one end of the cans, and the other half arranged on the outside of the ring on the opposite side of the circuit in relation with the opposite end of the cans, substantially as herein set forth.

2. In a soldering-machine, an endless chain or ring of intermittently rising and falling and rotary can-holders movable in a closed or endless circuit and disposed in an inclined or oblique plane, in combination with a series of soldering-tanks arranged in two tiers, one tier being placed at the bottom of the incline on the outside of the ring, and the other tier at the top of the incline on the inside of the ring and in operative relation with the ends of the cans carried by the can-holders, substantially as herein set forth.

3. In a soldering-machine, the combination, with an endless chain, of linked can-carriages movable in a closed or endless circuit and provided with can-holders carrying cans radial to the circuit, in combination with a series of soldering-troughs, one half arranged on the inside of the chain on one side of the circuit, and the other half placed on the outside of the chain on the other side of the circuit, and arranged in operative relation with the can-holders substantially as herein shown and described.

4. In a soldering-machine, the combination of an endless chain of linked can-carriages, a fixed guiding-track on which the train moves, a propelling device to advance the chain in said track in a continuous manner, with two sets of soldering-troughs, one set placed within the chain on one side of the circuit and the other set placed without the chain on the opposite side of the circuit, arranged and operating substantially as and for the purpose set forth.

5. In a soldering-machine, the combination of an endless chain of linked can-carriages, a fixed endless guiding-track in which the same moves, a propelling device to advance the chain in said track in a closed or continuous circuit, rotary can-holders in said carriages, holding the cans radial to the circuit, and two sets of soldering-troughs, one set placed within the chain on one side of the circuit, and the other placed without the chain on the other side of the circuit, substantially as shown and described.

6. The combination, with the inclined frames $d$, the inclined chain-wheels A, the guiding-tracks D, and an endless chain of can-holders moving therein around the wheels, of the level troughs $a\,b\,c$, placed in two tiers in relation with the two sides of the chain, substantially as herein shown and described.

7. A soldering-machine formed by the combination, with the endless chain, of linked carriages B, indented or zigzag guiding-track D, rotary can-holders C, cams $t\,u$, and soldering-troughs, arranged substantially as set forth.

8. The combination of the chain-wheels A, the endless chain of linked carriages B, rotary can-holders C, guiding-track D, cams $t\,u$, and troughs $a\,b\,c$, arranged and operating substantially as shown and described.

9. The combination, with the endless chain, of linked carriages B, rotary can-holders C, guiding-track D, guard-rails $p$, and troughs $a\,b\,c$, arranged and operating substantially as and for the purpose set forth.

10. In a soldering-machine, the combination, with a progressive can-carriage, of a rotary can-holder revolvable in the carriage, one part having a notch into which a projection on the other part falls when the holder is rotated to bring one side of the can into position for soldering, substantially as herein set forth.

11. In a can-soldering machine, substantially such as set forth, the combination, with the ring-shaped can-carriage B, having the notch $w$, of the rotary can-holder C, arranged and operating substantially as and for the purpose set forth.

FRANK M. LEAVITT.

Witnesses:
WALTER B. BAILEY,
WM. G. WILLS.